C. A. COUCH.
GAS MIXING DEVICE.
APPLICATION FILED JULY 5, 1917.
1,270,015.
Patented June 18, 1918.
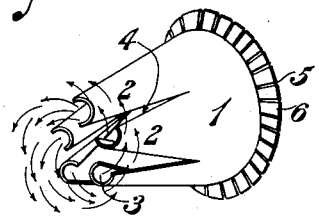
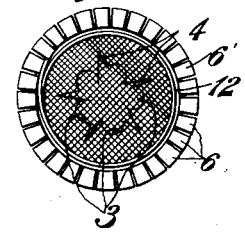
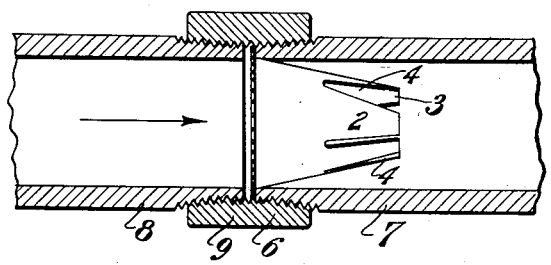
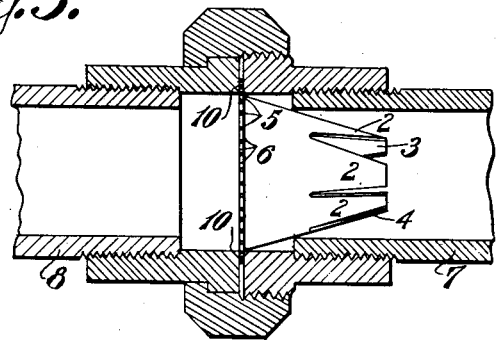
WITNESS:
B. H. Seaver.
INVENTOR.
Charles A. Couch,
BY
Harry W. Bourn
ATTORNEY.

UNITED STATES PATENT OFFICE.

CHARLES A. COUCH, OF SPRINGFIELD, MASSACHUSETTS, ASSIGNOR, BY MESNE ASSIGNMENTS, TO FUEL ECONOMY COMPANY, OF SPRINGFIELD, MASSACHUSETTS, AN ASSOCIATED TRUST OF MASSACHUSETTS.

GAS-MIXING DEVICE.

1,270,015.      Specification of Letters Patent.      Patented June 18, 1918.

Application filed July 5, 1917. Serial No. 178,821.

*To all whom it may concern:*

Be it known that I, CHARLES A. COUCH, citizen of the United States of America, residing in the city of Springfield, in the county of Hampden and State of Massachusetts, have invented certain new and useful Improvements in Gas-Mixing Devices, of which the following is a specification.

This invention relates to improvements in gas mixing devices; particularly it relates to improvements for thoroughly commingling the elements composing illuminating gas. It is a well-known fact that the elements composing ordinary illuminating gas form a mechanical mixture and not a chemical compound; that they are, therefore, more or less separated from each other. It has been found by carefully conducted experiments that if these elements are thoroughly mixed together before they emerge at the burner of a gas stove or gas jets greater heat will be produced and also increased illumination when the same volume of the illuminant is consumed and in an equal or given period of time.

The invention, broadly, comprises a member or element that is designed to be secured in the gas mains or pipes of a building. Preferably the location of the element should be located as near the meter as possible so that as the gas flows through and leaves the meter it is immediately brought into direct contact with the mixing member, and, after the gas leaves this mixing member sufficient volume or space within the pipes is provided to permit the elements to be thoroughly mixed together before they emerge at the point of use. The invention, broadly, comprises a conical shaped member made in the form of a frustum of a cone, the apex portion of the cone being open and slitted, and from which the gas emerges as it flows through the mixing device, the slits extending a suitable distance from the apex toward the base to form finger-like members between the slits, the ends of the finger-like members being given a suitable curve or other shape, whereby the gas, as it flows through this conical shaped member and in engagement with the curved finger-like elements and emerges therefrom, a swirling or spiral motion will be imparted to the gas resulting in the thorough mixing together of the elements already referred to. The invention further comprises means for inclosing the conical shaped member in a suitable casing, whereby the flow of the gas is confined more nearly to the opening in the apex and is not permitted to escape at the sides of the cone.

Referring to the drawings:

Figure 1 is a perspective view of the completed article or mixing device showing the slitted sides, the finger-like elements with the curved end portions and the radial fingers composing the slitted flange for clamping the article or device in place in the pipes;

Fig. 2 is a modification showing the construction illustrated in Fig. 1 but with an inclosing casing therefor and also illustrating the use of the wire gauze for the purpose of causing an even flow of gas through the cone;

Fig. 3 is an end view of Fig. 2 looking from the right toward the base portion;

Fig. 4 shows the device inserted in the pipes, the insertion being made where an ordinary coupling is used to secure the ends of the pipe together; and Fig. 5 shows the device inserted and clamped in the pipe by means of a union construction.

Referring to the drawings in detail: 1 indicates the cone-shaped gas mixing member as a whole having the finger-like members 2 formed as an integral part of the body portion. The ends of these members are curved as indicated at 3, the extent of curvature being preferably about 180 degrees. Between the finger-like members are the slots 4 which extend a suitable distance from the apex toward the base. The base part of the device is formed by slitting the same, as indicated at 5, and then bending the fingers 6 outward at substantially right-angles to the base, whereby a plurality of radially arranged fingers are provided which furnishes a suitable means, or clamping collar for securing the device in the pipes at the joints thereof. This is illustrated in Fig. 4 where the radial fingers 6 are shown clamped between the adjacent ends of the pipe sections, indicated at 7 and 8, the fingers being pinched or clamped between these ends, as shown, the usual internally threaded coupling being indicated at 9.

In Fig. 5 the gas-mixing device is shown as being secured within the pipe by means of the usual union construction for connecting the adjacent ends of the pipe sections 7 and 8 together, the flanged portion of the mixing device being shown between the ends of the union, as indicated at 10.

This mixing device serves the combined purpose of equalizing or maintaining a constant pressure at all hours during day or night in the pipes. It is well known that the pressure is not constant at all times, being less in the morning and greater at night. If the pressure is maintained at a constant value at all times at the burners of a gas range, or at the gas jets, the necessity of changing the supply of air at these points in order to obtain the necessary supply of oxygen for perfect combustion is eliminated, and, therefore, there will be less consumption of gas because the supply of oxygen would be constant after one adjustment and the mixture would also be substantially uniform at all times.

It will be seen from this device that as the gas flows through the mixing cone, the elements composing illuminating gas will impinge against the inner surfaces of the fingers 2, and, as these are made tapering and terminate in curved surfaces indicated at 3 a turbine or rotary effect will be imparted to the gas as it flows through and from the apex portion of the cone and into the gas mains or pipes resulting in a thorough commingling or mixing together of the various elements composing illuminating gas. This motion will be maintained during its passage through the pipes to the burners or jets.

In order to more thoroughly spread or evenly distribute the gas as it flows through the cone a wire gauze 11 is shown in Fig. 2 which is secured to the base portion of the cone shown in Fig. 2. It will be observed from Fig. 2 that the slits 4 are closed by means of an outer casing or shell 12. This casing extends the entire length of the cone and in parallel relation thereto. The slitted fingers 6 are clamped to the pipe as already described in connection with the coupling or union construction. This outer casing is spaced a very slight distance from the cone as shown at 13, and, therefore, causes the volume of gas to flow through the center or apex portion of the cone in a more solid or stream-like manner. On account of the gas being confined so as to flow through this opening a greater velocity and therefore a greater whirling motion would be imparted thereto by the curved ends of the fingers 2.

What I claim is:

1. A gas mixing device comprising a conical shaped member, the apex portion of which is slitted and formed with fingers having curved end portions, the base portion having a flanged portion for securing the device within the pipe at the coupling or union connection.

2. A device for mixing the elements of illuminating gas comprising a cone-shaped member the undivided sides of which are slitted to form finger-like elements, said elements having a permanent twist or curve imparted thereto to increase the size of the openings or slits, and for imparting a rotary motion to gas as it flows through the device, means for securing the cone within a gas pipe, whereby as the gas flows through the cone a rotary motion will be imparted thereto as it leaves the curved ends of the finger-like elements and the slits.

3. In a device for mixing together the substances composing illuminating gas, comprising, in combination, a truncated cone-shaped member, the base portion of which is formed with radiating fingers, said fingers designed for clamping between the ends of adjacent pipe sections or the pipe union, as described, and the apex portion of the cone having finger-like elements, the end portion of which are curved in the same direction to impart a rotary motion to the gas as it flows through the cone shaped member.

4. A gas mixing device consisting of a shell of cone shape, the apex of which is removed to form a contracted opening through the shell, the apex being being slitted to provide finger-like elements, the base portion having radially arranged fingers constituting a flange to engage the adjacent ends of pipe sections for securing the mixing device in place, and a gauze secured to the base portion of the cone to cause an even flow of the gas through the cone.

5. A cone-shaped mixing device for gaseous substance and having finger-like portions with curved ends for imparting a rotary motion to the gaseous substance as it flows therethrough and means on the device for securing the same within a pipe at its joints in the pipe connections.

6. A cone-shaped mixing device for gaseous substance having elongated inwardly curved finger-like portions for imparting a rotary motion to the gaseous substance as it flows therethrough and means on the device for securing the same within a pipe at its joints in the pipe connections.

CHARLES A. COUCH.